United States Patent
Pertry et al.

(10) Patent No.: US 6,895,462 B2
(45) Date of Patent: May 17, 2005

(54) INTEGRATED CIRCUIT

(75) Inventors: Carl Roger Pertry, Hemmingen (DE); Heiko Meyer, Korntal (DE); Thomas Schulz, Beitigheim-Bissingen (DE)

(73) Assignee: Alcatel, Paris (FR)

( * ) Notice: Subject to any disclaimer, the term of this patent is extended or adjusted under 35 U.S.C. 154(b) by 276 days.

(21) Appl. No.: 10/223,242

(22) Filed: Aug. 20, 2002

(65) Prior Publication Data

US 2003/0046478 A1 Mar. 6, 2003

(30) Foreign Application Priority Data

Aug. 21, 2001 (EP) .......................................... 01440275

(51) Int. Cl.⁷ ............................................. G06F 12/00
(52) U.S. Cl. ........................... 711/5; 711/154; 710/22; 710/118; 710/125; 370/400; 370/402; 370/419; 370/438; 370/440; 370/463
(58) Field of Search ................... 711/5, 154; 710/22, 710/118, 125; 370/400, 402, 419, 438, 440, 463

(56) References Cited

U.S. PATENT DOCUMENTS

| | | | |
|---|---|---|---|
| 6,353,619 B1 * | 3/2002 | Banas et al. ................ | 370/463 |
| 6,463,072 B1 * | 10/2002 | Wolrich et al. ............. | 370/439 |
| 2003/0093702 A1 * | 5/2003 | Luo et al. ................... | 713/320 |

FOREIGN PATENT DOCUMENTS

WO   WO 0116770 A1   3/2001

OTHER PUBLICATIONS

T.L. Johnson: "RISC Implementation Features of the MC68030 Microprocessor" Electro/87 and Mini/Micro Northeast: Conference Record Bd. 12, Apr. 7–9, 1987, pp. 1–9, Electronics Conventions Management. Los Angeles, US.

Hiroaki Kaneko et al: "Realizing the V80 ANF Its System Support Functions" IEEE Micro, IEEE Inc. New York, US, Bd. 10, Nr. 2, Apr. 1, 1990 pp. 56–69.

* cited by examiner

*Primary Examiner*—Donald Sparks
*Assistant Examiner*—Bao Q Truong
(74) *Attorney, Agent, or Firm*—Sughrue Mion, PLLC

(57) ABSTRACT

An integrated circuit includes a processor and at least one module and provides registers required for the modules as well as access to these registers. By concentrating the required registers according to the invention in a central register bank, which like the processor and the modules is connected to a fast AMBA-AHB bus, several advantages are achieved: for one, faster access is possible to each register. For another, the placement of the registers and the routing for the registers is simplified. This in particular allows chip area to be saved, which leads to cost savings in manufacture and enables higher component density. Furthermore, a slow AMBA-APB bus has now become optional.

14 Claims, 1 Drawing Sheet

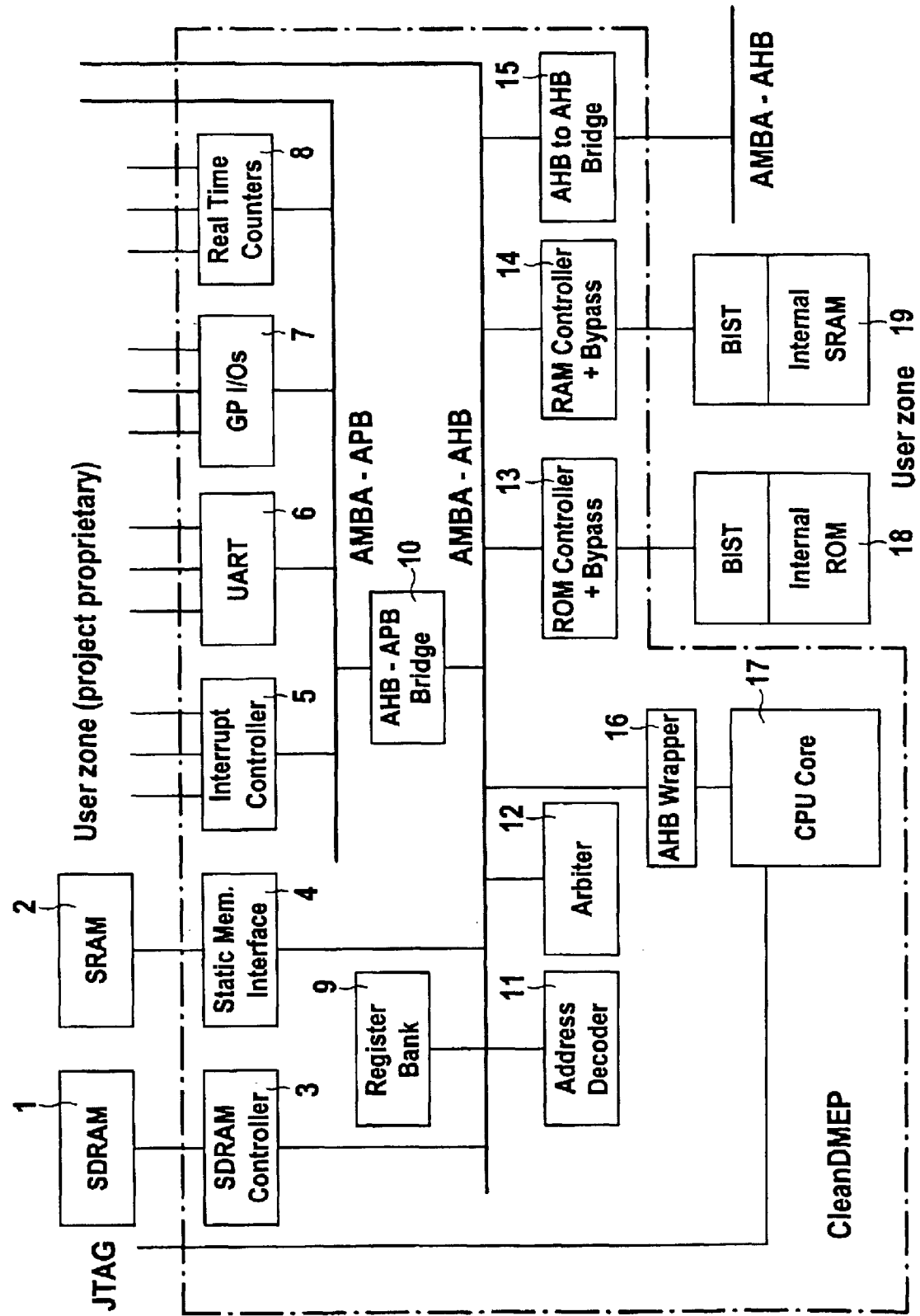

INTEGRATED CIRCUIT

TECHNICAL FIELD

The invention relates to an integrated circuit. The invention is based on a priority application EP 01 440 275.4 which is hereby incorporated by reference.

BACKGROUND OF THE INVENTION

Integrated circuits are implemented e.g. as system-on-chip on an ASIC; ASIC=Application Specific Integrated Circuit. An ASIC comprises special circuits, which are tailored to customers' wishes. These perform specific tasks. In telecommunications, for example, they are used for processing VoIP signals, DSL, ATM, SDH, SONET, UMTS, GSM, LMDS or ISDN signals; VoIP=Voice over Internet Protocol, DSL=Digital Subscriber Line, ATM=Asynchronous Transfer Mode, SDH=Synchronous Digital Hierarchy, SONET=Synchronous Optical Network, UMTS=Universal Mobile Telecommunication System, GSM=General System Mobile, LMDS=Local Multipoint Digital System, ISDN=Integrated Services Digital Network. They therefore serve for processing speech, data, video, Internet web pages, etc.

An integrated circuit has e.g. a special processor platform for implementing general but also application-specific tasks. This processor platform can be used for any applications; the same processor platform for example in DSL chips, ATM chips etc. It includes a processor and supplies computing capacity.

The processor platform has several components, some components being connected to a fast AMBA-AHB bus, e.g. a processor, a ROM controller, a RAM controller, and other components being connected to a slow AMBA-APB bus, e.g. an interrupt controller, a real time counter; ROM=Read Only Memory, RAM=Random Access Memory. The question of which component is connected to which bus depends on the access speed, the processing speed and the frequency of use of the component.

For some components, such as the ROM controller and the RAM controller, which are hereinafter referred to as modules, control registers are necessary. The usual solution provides for each module one or more control registers connected to the slow AMBA-APB bus.

SUMMARY OF THE INVENTION

It is the object of the invention to supply an integrated circuit that contains a processor and at least one module and provides an alternative access to registers required for the modules.

This object is achieved with an integrated circuit, in particular a system-on-chip, comprising a processor platform with a processor, at least one module and a register bank, which are linked together via a bus, the register bank containing at least one register assigned to a module.

By concentrating the required registers in a central register bank, which is connected to the fast AMBA-AHB bus, several advantages are achieved: for one, faster access is possible to each register. For another, the placement of the registers and the routing for the registers is simplified. This in particular allows chip area to be saved, which leads to cost savings in manufacture and enables higher component density. Furthermore, the slow AMBA-APB bus has now become optional. The control registers for the ROM and RAM controllers are always required. If they are connected to the AMBA-APB bus, then this must also always be provided. However, the components connected to the AMBA-APB bus are not necessary in every development of an ASIC. If these are not wanted in a specific development, then by the use of a central register bank connected to the AMBA-AHB bus, both the AMBA-APB bus and the bridge between the two buses can be dispensed with in the design and manufacture. This again leads to an increase in the component density and thus reduces the required chip area, which can then be used e.g. for other components. A central register bank thus enables increased flexibility in the design of ASICs.

Advantageous developments can be taken from the dependent claims and the subsequent description.

BEST MODE FOR CARRYING OUT THE INVENTION

The invention is explained hereinafter on the basis of an embodiment and with the help of a FIGURE.

The FIGURE shows a schematically represented detail of an integrated circuit according to the invention.

The detail shows a processor platform identified as CleanDMEP and several modules connected to the processor platform; CleanDMEP=Clean Design Methodology for Embedded Processors. The processor platform is a general platform and can be used for any processing, e.g. in telecommunications, in mechanical engineering, in aerospace, etc.; in telecommunications for example for all forms of XDSL, for UMTS, VoIP, etc.

The integrated circuit is implemented e.g. as system-on-chip on an ASIC. It comprises on the one hand the processor platform with a processor 17, one or more AHB master and/or slave modules 3, 13, 14 and a central register bank 9, which are linked together via a bus AMBA-AHB. Module 3 is e.g. implemented as a SDRAM controller, module 13 as a ROM controller and module 14 as a RAM controller. The register bank 9 contains the three control registers for the three modules 3, 13, 14. Each module 3, 13, 14 has access over the bus AMBA-AHB to the register assigned to it. The bus is e.g. designed as a fast bus, e.g. as an AMBA-AHB bus.

The general structure of the processor platform is explained hereinafter.

The processor platform contains a module 3 implemented as a SDRAM controller, which is connected on the one hand to the fast internal bus AMBA-AHB, and on the other hand to a SDRAM 1 that is internal but arranged outside the processor platform. Internal means within the integrated circuit, external outside the integrated circuit. The SDRAM controller controls the access to the SDRAM 1, and performs the necessary conversion on the bus protocol. The SDRAM 1 can also be arranged outside the integrated circuit, i.e. externally.

The processor platform further contains a static memory interface 4, which is connected on the one hand to the fast internal bus AMBA-AHB and on the other hand to a SRAM 2 that is internal but arranged outside the processor platform. The static memory interface 4 controls the access to the SRAM 2 and performs the necessary conversion on the bus protocol. The SRAM 2 can also be arranged outside the integrated circuit, i.e. externally.

Also provided is an interrupt controller 5, which on the one hand is connected to a slow internal bus e.g. implemented as AMBA-APB, and on the other hand presents at least one interface to a module that is internal or external but arranged outside the processor platform. The interrupt controller 5 serves to connect interrupts from modules outside the platform to the processor.

Also provided is a UART 6, which on the one hand is connected to the slow internal AMBA-APB bus, and on the other hand presents an interface to an external host processor that is arranged outside the processor platform. The UART 6 serves for transferring data between the external host processor and the internal processor (17).

Also provided is a GP I/O 7, which on the one hand is connected to the slow internal AMBA-APB bus, and on the other hand presents at least one interface to a module that is internal or external but arranged outside the processor platform. The GP I/O 7 serves to transfer control information between modules outside the platform and the internal processor (17); GP I/O=General Purpose In/Out.

Also provided is a real time counter 8, which on the one hand is connected to the slow internal AMBA-APB bus, and on the other hand presents at least one interface to a module that is internal or external but arranged outside the processor platform. The real time counter 8 serves as a timer, which runs with the system clock.

A register bank 9 is further provided, which is connected to the fast AMBA-AHB bus. The register bank 9 supplies registers for several modules, including e.g. RAM controller 14 and SDRAM controller 3. Registers can e.g. be provided for modules 3, 4, 11, 12, 13, 14, 15. Register bank 9 supplies a common access for all registers to the AMBA-AHB bus. This single interface allows register bank 9 to be implemented more simply.

An arbiter 12, which is connected to the fast AMBA-AHB bus, serves in the case of simultaneous access by several masters to the fast bus, to prioritise these accesses and process them in the prioritised order.

The processor 17 is implemented e.g. as a microprocessor or as a digital signal processor. It may be connected via an AHB wrapper to the fast AMBA-AHB bus. The AHB wrapper 16 performs the necessary conversions of the protocols as required.

Module 13 is implemented e.g. as a ROM controller, which is connected on the one hand to the fast AMBA-AHB bus, and on the other hand to an internal ROM 18 arranged outside the processor platform, which ROM can also contain a BIST; BIST=Build-In Self Test.

The ROM controller controls the access to the internal ROM 18, and performs the necessary conversion on bus protocol.

Module 14 is implemented as a RAM controller and connected on the one hand to the fast internal bus AMBA-AHB, and on the other hand to an internal SRAM 19 arranged outside the processor platform. The RAM controller controls the access to the SRAM 19 and performs the necessary conversion on bus protocol. The SRAM 19 can also contain a BIST.

A bridge 10 is also provided. Bridge 10 connects the fast AMBA-AHB bus to the slow AMBA-APB bus. A connection between the modules connected to the AMBA-AHB bus and the modules connected to the AMBA-APB bus is thus established over the bridge 10. Processor 17 thus has e.g. access over bridge 10 to the interrupt controller 5. The apportionment with two buses with different processing speeds has the advantage that slow accesses do not impede fast accesses. Bridge 10, AMBA-APB bus and the modules connected to it are optional. If the functions of the modules are not needed, they and the AMBA-APB bus, and bridge 10, can be omitted from the design, leading to a saving of space and reduction of manufacturing costs.

Processor 17 has a connection to a JTAG=Joint Test Action Group. The JTAG interface can be used for debugging the SW on the internal processor, but also during the production control for the ASIC.

The AMBA-APB bus can be continued internally outside the processor platform, and if applicable also externally, outside the integrated circuit.

The AMBA-AHB bus can be continued internally outside the processor platform, and if applicable also externally, outside the integrated circuit.

The embodiment represents one specific processor platform. The invention can be applied to any processor platform, in particular a processor platform with fewer or more elements than those shown in the FIGURE. The integrated circuit can also present more than one processor, more than one control input and more than one external memory. If for example two processors are managed through a common address management, one control input and one external memory can be sufficient for both processors. As well as the special processor platform, further processors and modules can also be arranged on the integrated circuit, and can also make up the greater part of the integrated circuit, e.g. 80%, so that only e.g. 20% is allotted to the processor platform. The integrated circuit can also contain two or more processor platforms.

In the embodiment the modules are implemented as ROM, RAM and SDRAM controllers. A module can e.g. also be implemented as a DRAM, PROM, EPROM or EEPROM; PROM=Programmable ROM, EPROM= Erasable PROM.

In the embodiment, AMBA buses are used chip-internally, and AMBA buses and/or a PCI bus chip-externally. It is also possible to use chip-internally e.g.: CoreConnect bus, CoreFrame bus, FISPbus or IPbus. It is also possible to use chip-externally e.g.: VMEbus, USB Bus, etc.

Instead of one or two buses for chip-internal connection of the components, three or more buses can also be used, e.g. an extra bus for the linking of the arbiter to several components. The processors are implemented as ARM, Intel or AMD processors, for example.

Abbreviations:
AMBA=Advanced Micro-controller Bus Architecture,
AHB=Advanced High-performance Bus,
APB=Advanced Peripheral Bus,
ARM=Advanced RISC Machine,
VHDL=VHSIC Hardware Description Language.

What is claimed is:

1. An integrated circuit, implemented as a system-on-chip, comprising a processor platform which comprises a processor, at least two modules and a register bank, which are linked together via a bus, the register bank including at least two control registers assigned to the at least two modules.

2. The integrated circuit according to claim 1, wherein at least one of said two modules is implemented as a controller.

3. The integrated circuit according to claim 1, wherein in the register bank all registers needed for the modules are centrally arranged.

4. The integrated circuit according to claim 1, wherein one module is implemented as a ROM controller and the other module is implemented as a RAM controller.

5. The integrated circuit according to claim 1, wherein the bus is implemented as an AMBA-AHB bus.

6. The integrated circuit according to claim 5, wherein the processor is connected via an AHB wrapper to the AMBA-AHB bus.

7. The integrated circuit according to claim 6, wherein in the processor platform at least one component is provided, which is connected via an AMBA-APB bus and a bridge to the AMBA-AHB bus.

8. An integrated circuit implemented as a system-on-chip, comprising a processor platform which comprises a processor, at least one module and a register bank, which are linked together via a bus, the register bank including at least one register assigned to the at least one module, wherein in the register bank all registers needed for the modules are centrally arranged.

9. The integrated circuit according to claim 8, wherein the at least one module is implemented as a controller.

10. The integrated circuit according to claim 8, wherein the register bank includes at least two control registers for at least two modules.

11. The integrated circuit according to claim 8, wherein the processor platform includes a first module implemented as a ROM controller and a second module implemented as a RAM controller.

12. The integrated circuit according to claim 8, wherein the bus is implemented as an AMBA-AHB bus.

13. The integrated circuit according to claim 12, wherein the processor is connected via an AHB wrapper to the AMBA-AHB bus.

14. The integrated circuit according to claim 12, wherein in the processor platform at least one component is provided, which is connected via an AMBA-APB bus and a bridge to the AMBA-AHB bus.

* * * * *